US011167359B2

(12) United States Patent
Thiel et al.

(10) Patent No.: US 11,167,359 B2
(45) Date of Patent: Nov. 9, 2021

(54) PORTABLE MACHINE TOOLS, KITS, AND METHODS FOR MACHINING ANNULAR AND STRAIGHT PLANAR SURFACES

(71) Applicant: Climax Portable Machine Tools, Inc., Newberg, OR (US)

(72) Inventors: Scott J. Thiel, Sherwood, OR (US); Daniel M. Jensen, Hillsboro, OR (US); Mark J. Owens, Sherwood, OR (US); Daniel J. Hanson, Portland, OR (US); Sydnee M. Hammond, Portland, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 0 days.

(21) Appl. No.: 16/837,890

(22) Filed: Apr. 1, 2020

(65) Prior Publication Data
US 2020/0331073 A1 Oct. 22, 2020

Related U.S. Application Data

(60) Provisional application No. 62/835,995, filed on Apr. 18, 2019.

(51) Int. Cl.
*B23C 3/13* (2006.01)
*B23P 15/26* (2006.01)

(52) U.S. Cl.
CPC .............. *B23C 3/13* (2013.01); *B23P 15/26* (2013.01)

(58) Field of Classification Search
CPC .......... Y10T 82/22; Y10T 409/306384; B23Q 9/0014; B23Q 9/0042; B23Q 9/005;
(Continued)

(56) References Cited

U.S. PATENT DOCUMENTS 2,079,735 A * 5/1937 Doran ................ B23C 9/00
29/30
3,630,109 A * 12/1971 MacMichael .......... B23B 3/265
82/113
(Continued)

OTHER PUBLICATIONS

ODF30 Speed Facer Operating Manual, H & S Tool (a Climax company), P/N 89049, Feb. 2018.

*Primary Examiner* — Jason L Vaughan
(74) *Attorney, Agent, or Firm* — Dascenzo Gates Intellectual Property Law, P.C.

(57) ABSTRACT

Methods comprise machining each of an annular planar surface and a linear planar surface of a workpiece using a combination flange facer and milling machine. Methods comprise using a machine frame of a flange facer and a rotating ring of the flange facer to mount a milling machine to a workpiece, and machining the workpiece using the milling machine when it is coupled to the rotating ring of the flange facer. Portable machining kits comprise a flange facer and a milling machine that is configured to be operatively mounted to the rotating ring of the flange facer. Portable machine tools comprise a machine frame, a rotating ring, a bridge coupled to the rotating ring, a facing tool head assembly configured to be selectively coupled to and decoupled from the bridge, and a milling tool head assembly configured to be selectively coupled to and decoupled from the bridge.

21 Claims, 9 Drawing Sheets

(58) Field of Classification Search
CPC ....... B23Q 9/0007; B23B 3/265; B23C 1/002;
B23D 7/04
USPC .......................................................... 408/26
See application file for complete search history.

(56) References Cited

U.S. PATENT DOCUMENTS

| | | | | |
|---|---|---|---|---|
| 3,908,491 | A * | 9/1975 | Gilmore | ............ B23B 29/03439 |
| | | | | 82/113 |
| 4,050,335 | A * | 9/1977 | Gilmore | .................. B23B 3/265 |
| | | | | 82/113 |
| 4,231,690 | A * | 11/1980 | Burns | ........................ B23Q 5/04 |
| | | | | 408/100 |
| 4,778,316 | A | 10/1988 | Strait | |
| 4,852,435 | A | 8/1989 | Hunt | |
| 5,050,291 | A * | 9/1991 | Gilmore | ............... B23Q 9/0021 |
| | | | | 29/560 |
| 5,106,243 | A | 4/1992 | Hunt | |
| 5,297,907 | A | 3/1994 | Strait | |
| 5,630,346 | A | 5/1997 | Strait | |
| 5,775,188 | A | 7/1998 | Strait | |
| 9,089,899 | B2 * | 7/2015 | Place | ....................... B23B 5/162 |
| 9,186,763 | B2 | 11/2015 | Weidman et al. | |
| 9,421,651 | B2 * | 8/2016 | Yang | ......................... B23D 7/04 |
| 10,166,640 | B2 * | 1/2019 | Reid | .......................... B64F 5/10 |

* cited by examiner

PORTABLE MACHINE TOOLS, KITS, AND METHODS FOR MACHINING ANNULAR AND STRAIGHT PLANAR SURFACES

RELATED APPLICATION

This application claims priority to U.S. Provisional Patent Application No. 62/835,995, entitled "METHODS AND KITS FOR MACHINING TUBE SHEETS OF SHELL-AND-TUBE HEAT EXCHANGERS" and filed on Apr. 18, 2019, the disclosure of which is hereby incorporated by reference.

FIELD

The present disclosure relates to machining annular and straight planar surfaces.

BACKGROUND

Shell-and-tube heat exchangers comprise several tubes housed within a cylindrical shell. Some shell-and-tube heat exchangers include tube sheets at opposing ends of the tubes to fluidically seal the cylindrical shell and thus to prevent the shell-side fluid from entering the heat exchanger's opposing heads (also referred to as channels or bonnets), where the tube-side fluid is routed. Accordingly, the tube sheets have an annular gasket surface, whose surface finish is critical for maintaining a proper seal with the adjacent head. Tube sheets also include holes through which the tubes extend for fluid communication with the heads. The heads include partition plates (planar structures with straight edges) for segregating regions of the heads and controlling the flow of tube-side fluid therethrough. The tube sheets have corresponding linear grooves for receipt of the partition plates, with the finish of the grooves' surfaces being critical for a proper seal with the partition plates when the heat exchanger is assembled. In some shell-and-tube heat exchangers, all of the partition plates are parallel to each other, while in other shell-and-tube heat exchangers, partition plates may not all be parallel to each other, such as with at least one partition plate being perpendicular to one or more other partition plates. FIG. 1 depicts a tube sheet 10 having an annular gasket surface 12 and a single linear groove 14, FIG. 2 depicts a tube sheet 16 having an annular gasket surface 12 and two parallel linear grooves 14, and FIG. 3 depicts a tube sheet 18 having an annular gasket surface 12 and three linear grooves 14, one of which is perpendicular to the other two. In the examples of FIGS. 1 and 2, the annular gasket surface 12 is coplanar with the linear grooves 14, while in the example of FIG. 3, the linear grooves 14 are raised relative to the annular gasket surface 12.

When such shell-and-tube heat exchangers are rebuilt or otherwise serviced, the annular gasket surface and the groove(s) of the tube sheets often are refinished. Historically, to do so, a flange facer is first mounted to the tube sheet for refinishing the annular gasket surface. Then, the flange facer is unmounted, and a cantilever milling machine is subsequently mounted to the tube sheet and used to mill the grooves. However, because cantilever milling machines are limited in their range of motion, the cantilever milling machine typically must be unmounted and remounted in various positions to be able to mill all of the tube sheet's grooves, especially when there are grooves that are not parallel to each other. After the annular gasket surface and linear grooves are resurfaced, chamfers (indicated at 20 in FIGS. 1-3) at the intersection of the annular gasket surface and the linear grooves and/or at the intersection of two linear grooves are manually machined using a powered hand grinder and/or hand-filed with a rasp and/or file. The mounting and unmounting of the cantilever milling machine as well as the manual filing are very time consuming, and thus costly.

SUMMARY

Portable machine tools and related kits and methods for machining annular and linear planar surfaces are disclosed herein.

Some methods comprise machining each of an annular planar surface and a linear planar surface of a workpiece using a combination flange facer and milling machine. Some methods comprise using a machine frame of a flange facer and a rotating ring of the flange facer to mount a milling machine to a workpiece; and machining the workpiece using the milling machine when it is coupled to the rotating ring of the flange facer. Some methods comprise fixedly coupling a machine frame of a portable machine tool to a workpiece; while the machine frame is fixedly coupled to the workpiece, facing an annular planar surface using a facing tool head assembly by rotating a rotating ring of the portable machine tool relative to the machine frame; locking the rotating ring relative to the machine frame; and while the machine frame is fixedly coupled to the workpiece, milling a linear planar surface using a milling tool head assembly.

Some portable machining kits comprise a flange facer that comprises a machine frame, a rotating ring that is rotatingly coupled to the machine frame, and a tool assembly that is removably coupled to the rotating ring; and a milling machine that is configured to be operatively mounted to the rotating ring of the flange facer.

Some portable machine tools comprise a machine frame configured to be fixedly coupled to a workpiece; a rotating ring that is rotatingly coupled to the machine frame; a bridge coupled to the rotating ring; a facing tool head assembly configured to be selectively coupled to and decoupled from the bridge; and a milling tool head assembly configured to be selectively coupled to and decoupled from the bridge.

DESCRIPTION

Figure 4:
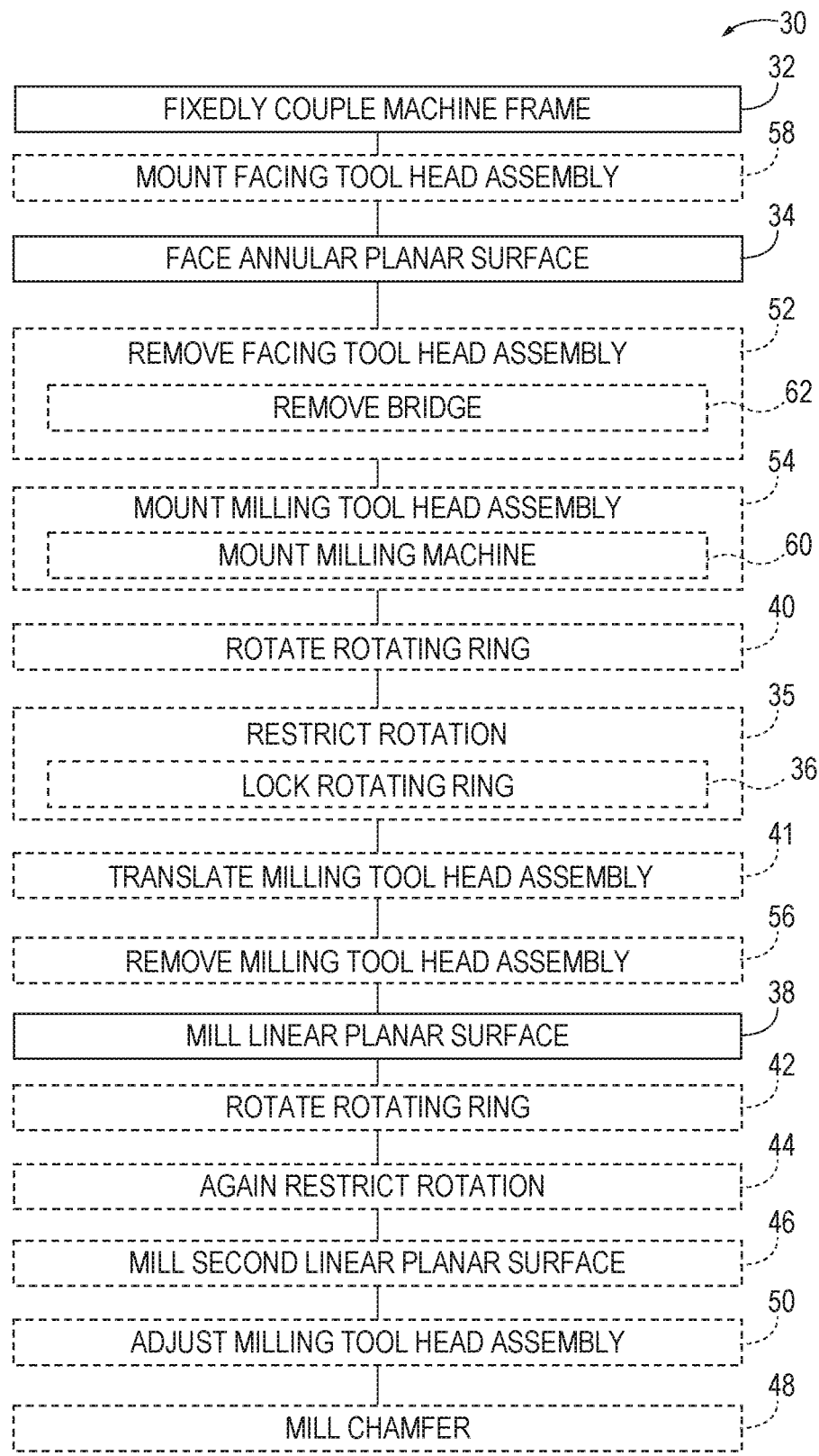
FIG. 4 is a flowchart, schematically representing methods according to the present disclosure.
Figure 5:
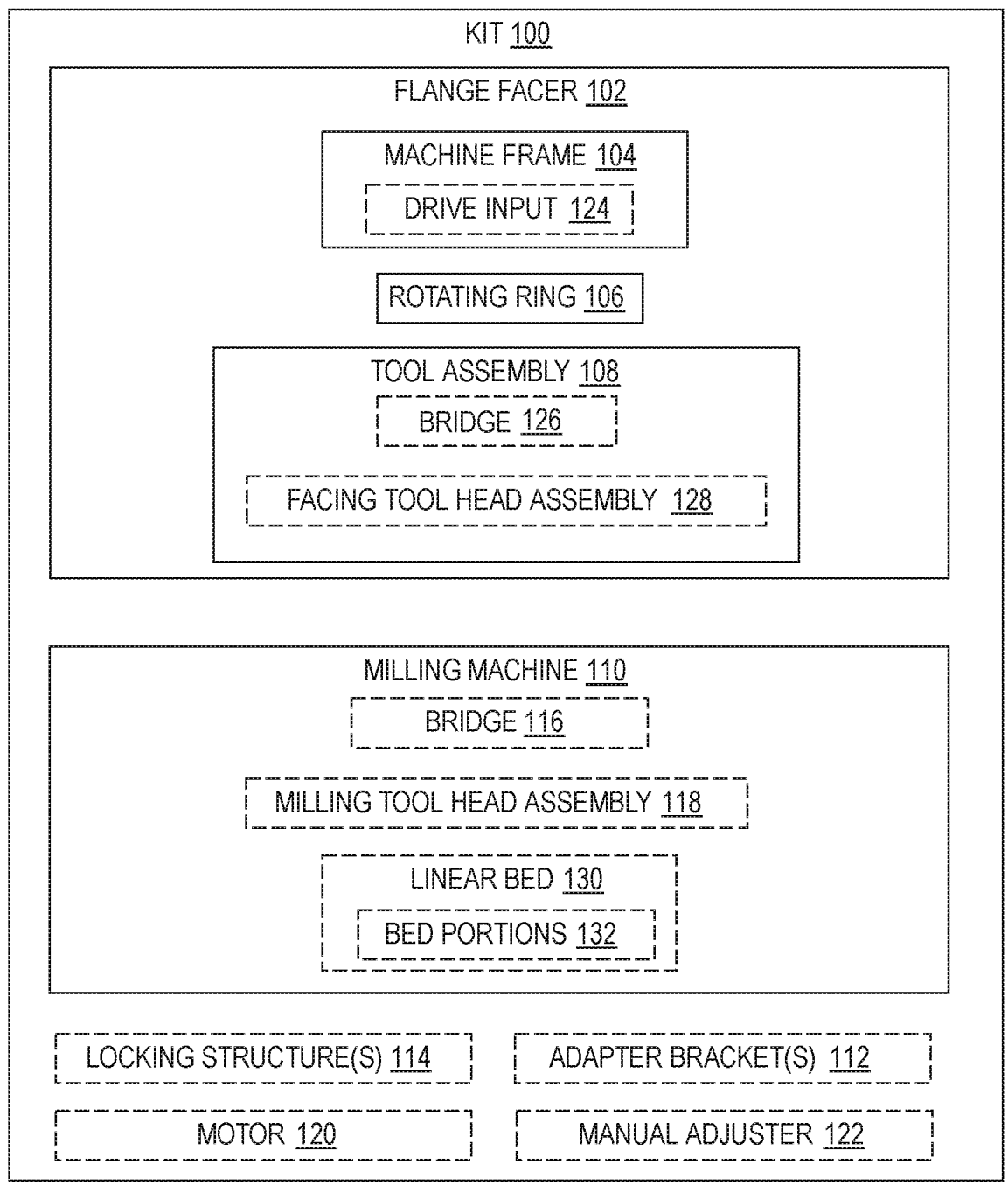
FIG. 5 is a schematic diagram representing example portable machining kits according to the present disclosure.
Figure 6:
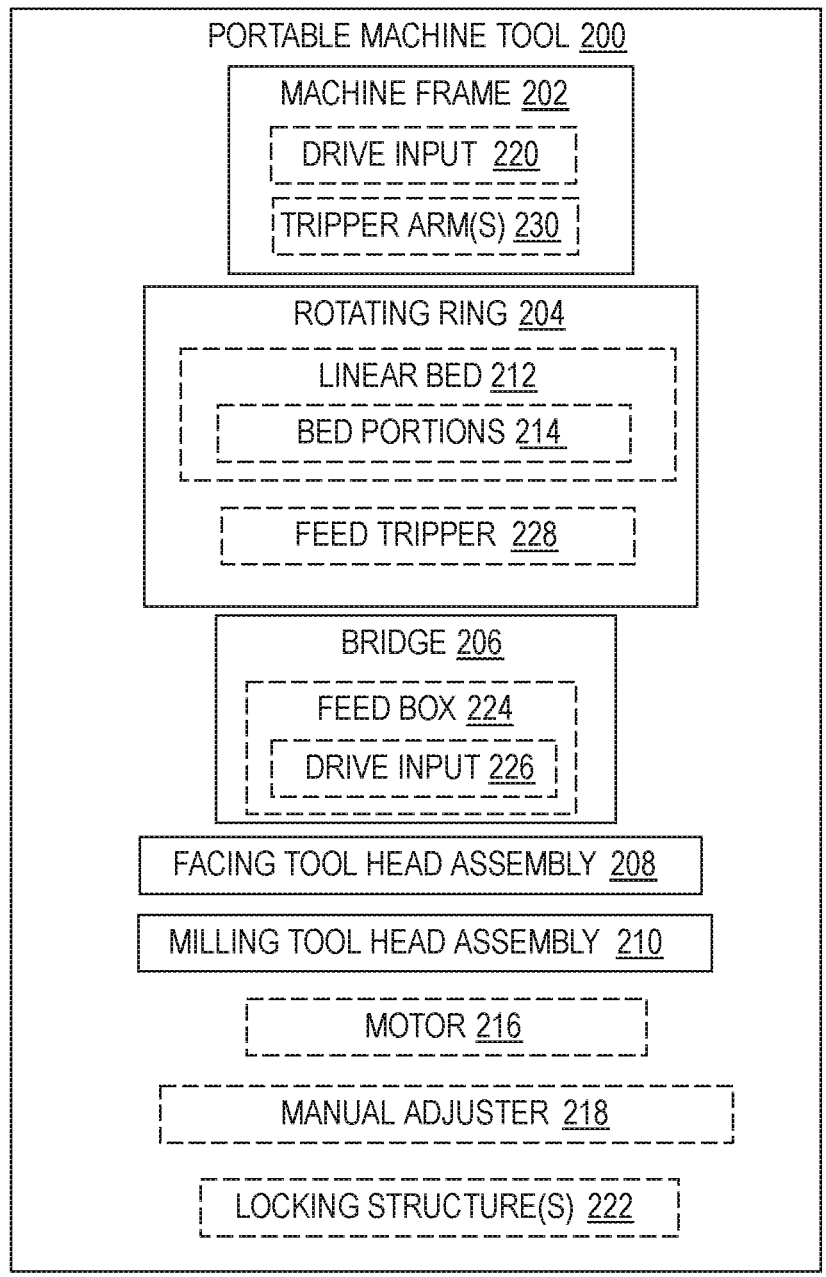
FIG. 6 is a schematic diagram representing example portable machine tools according to the present disclosure.

Methods 30, portable machining kits 100, and portable machine tools 200 for machining annular and linear planar surfaces on a workpiece are disclosed. FIG. 4 schematically provides a flowchart that represents illustrative, non-exclusive examples of methods 30, FIG. 5 schematically represents portable machining kits 100, FIG. 6 schematically represents portable machine tools 200, and FIGS. 7-11 illustrate an illustrative, non-exclusive example of a portable machine tool 200. Methods 30 may be performed by example portable machining kits 100 and/or example portable machine tools 200, and conversely, portable machining kits 100 and portable machine tools 200 may be configured to perform example methods 30. In general, in FIGS. 4-6, elements that are likely to be included are illustrated in solid lines, while elements that may be optional to a given example or otherwise correspond to a specific example are illustrated in dashed lines. However, elements that are shown in solid lines are not essential to all examples, and an element shown in solid lines may be omitted from a given example without departing from the scope of the present disclosure. Moreover, the steps of methods 30 are not required to be performed in the order illustrated in FIG. 4, and the steps may be performed in any suitable, or operable, order. That said, in some examples of methods 30, an order of steps may be required, as discussed in detail herein with respect to such example methods 30.

Starting with FIG. 4, methods 30 typically include at least fixedly coupling (at 32) a machine frame of a portable machine tool to a workpiece; while the machine frame is fixedly coupled to the workpiece, facing (at 34) an annular planar surface on the workpiece using a facing tool head assembly by rotating a rotating ring of the portable machine tool relative to the machine frame; and while the machine frame is fixedly coupled to the workpiece, milling (at 38) the linear planar surface using a milling tool head assembly. In some examples, the portable machine tool that is fixedly coupled to the workpiece is a flange facer 102 of a portable machining kit 100, discussed in greater detail below in connection with FIG. 5. In such examples, the machine frame and the rotating ring are the machine frame 104 and the rotating ring 106 of the flange facer 102, and the facing tool head assembly is a component of the tool assembly 108 of the flange facer 102. In other examples, the portable machine tool that is fixedly coupled to the workpiece is a portable machine tool 200, discussed in greater detail below in connection with FIG. 6.

By "fixedly coupling," it is meant that, while the machine frame may be subsequently decoupled from the workpiece, as a whole, it does not move relative to the workpiece when it is fixedly coupled thereto. That said, component parts of the machine frame, such as a drive train operable to rotate the rotating ring, may in fact move. By "locking the rotating ring relative to the machine frame," it is meant that the rotating ring is selectively (e.g., by a user) and temporarily restricted from rotating relative to the machine frame. This operation may be accomplished in any suitable manner, including, for example, with an integral clamping mechanism of the portable machine tool, with a locking rod or other structure that is selectively extended through aligned holes in the machine frame and rotating ring, etc. When the rotating ring is operably locked to the machine frame, the milling step may be performed without the rotating ring inadvertently rotating and detrimentally affecting a desired (linear) cutting path of the milling tool head assembly.

A "tool head assembly" is an assembly that comprises a corresponding cutting tool or that is configured to operatively receive a corresponding cutting tool for performing the corresponding machining. Accordingly, a "facing tool head assembly" when including a facing cutting tool is configured to perform a facing operation (i.e., machine an annular planar surface), and a "milling tool head assembly" when including a milling cutting tool is configured to perform a milling operation (i.e., machine a linear planar surface).

In some examples, the portable machine tool may be described as an outer-diameter (OD) mounted portable machine tool, such as that is configured to clamp against the outer surface of a cylindrical workpiece. In some examples, the workpiece is a tube sheet of a shell-and-tube heat exchanger, the annular planar surface is an annular circular gasket surface of the tube sheet, and the linear planar surface is a linear groove of the tube sheet; however, methods 30 may be used to machine annular and linear planar surfaces of any suitable workpiece and not exclusively tube sheets of shell-and-tube heat exchangers.

In some examples, methods 30 further comprise restricting (at 35) rotation of the rotating ring relative to the machine frame, such that the milling (at 38) is performed while the rotating ring is restricted from being rotated. Accordingly, when the milling operation is performed, the rotating ring will not rotate as a result of torques applied to the rotating ring as a result of the milling operation. In such methods, the restricting (at 35) may be accomplished in any suitable manner. For example, the static torque, or resistance, of a motor and/or associated gear box or gearing may be sufficient to restrict rotation of the rotating ring relative to the machine frame. In some examples, the restricting (at 35) comprises locking (at 36) the rotating ring relative to the machine frame. For example, locking structure may be provided that is configured to selectively and operatively restrict the rotating ring from rotating relative to the machine frame, examples of which are discussed herein.

With continued reference to FIG. 4, some methods 30 further comprise, while the machine frame is fixedly coupled to the workpiece and prior to the (optional) restricting (at 35), rotating (at 40) the rotating ring relative to the machine frame to align the milling tool head assembly relative to the workpiece for milling the linear planar surface using the milling tool head assembly. When the optional restricting (at 35) is performed, it is performed following the rotating (at 40). In other words, the rotating ring is rotated to a desired position relative to the machine frame and thus relative to a workpiece to be milled, and then the rotating ring is restricted, or locked, in place while the milling (at 38) is performed.

In yet further examples, when the workpiece includes more than one linear planar surface to be machined, and when at least two linear planar surfaces are non-parallel to each other, some methods 30 further comprise rotating (at 42) the rotating ring relative to the machine frame to align the milling tool head assembly relative to the workpiece for milling a second linear planar surface on the workpiece. In some such examples, the rotating ring is again restricted (at 44) from rotation relative to the machine frame prior to milling (at 46) the second linear planar surface using the milling tool head assembly.

When the workpiece includes more than one linear planar surface to be machined, and when at least two linear planar surfaces are parallel to each other, some methods 30 further comprise translating (at 41) the milling tool head assembly relative to the rotating ring to align the milling tool head assembly relative to the workpiece for milling a second linear planar surface on the workpiece using the milling tool head assembly. In more specific examples, when the milling tool head assembly is operatively coupled to a bridge, the bridge is translated relative to the rotating ring to align the milling tool head assembly with the second linear planar surface.

Figure 1:
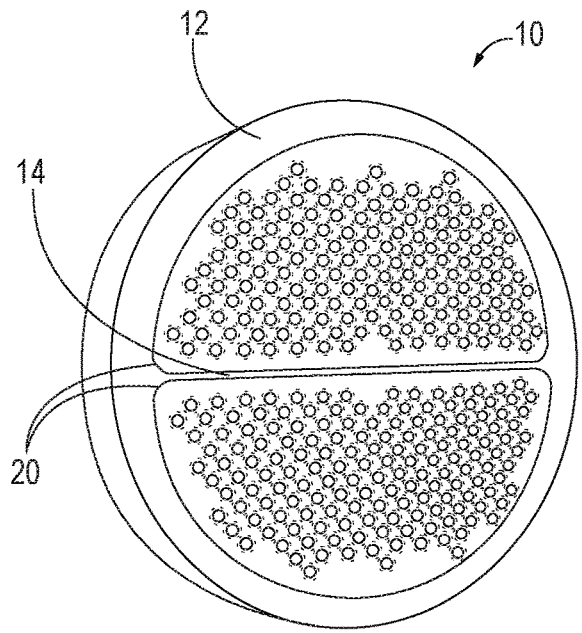
FIG. 1 is an illustration of an example tube sheet having a single linear groove.
Figure 2:
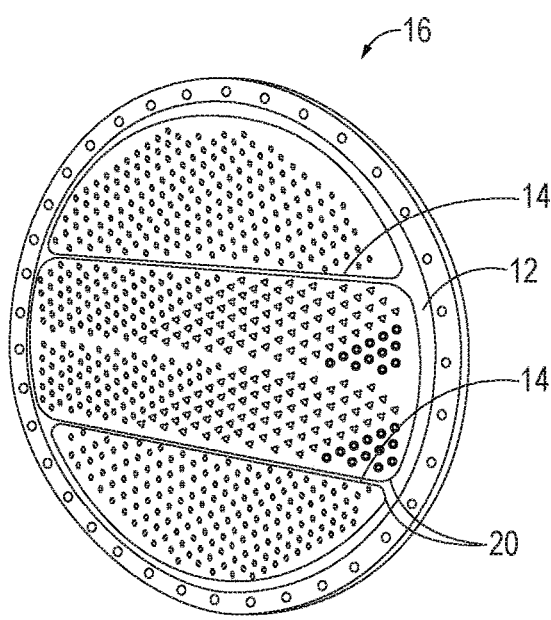
FIG. 2 is an illustration of an example tube sheet having two parallel linear grooves.
Figure 3:
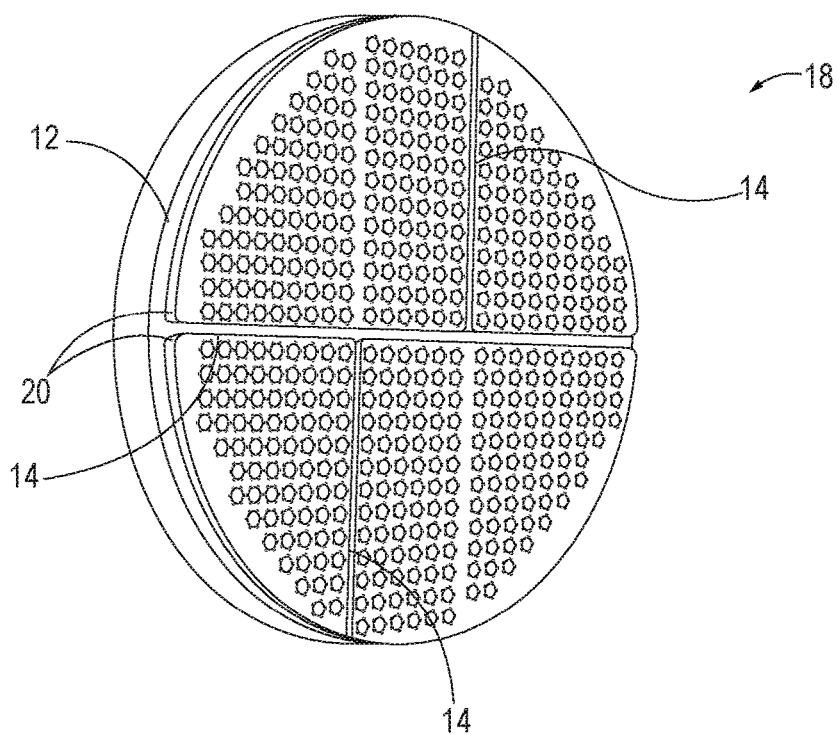
FIG. 3 is an illustration of an example tube sheet having three linear grooves, one of which is perpendicular to the other two.

Some examples of methods 30 further comprise, while the machine frame is fixedly coupled to the workpiece, milling (at 48) a chamfer on a portion of the workpiece extending away from where the annular planar surface and the linear planar surface intersect or otherwise meet or terminate, or on a portion of the workpiece extending away from where two linear planar surfaces intersect or otherwise meet or terminate. Herein, these portions of a workpiece may be described as being between the annular planar surface and the linear planar surface or between a first linear planar surface and a second linear planar surface. Examples of these portions of workpieces in the form of tube sheets of shell-and-tube heat exchangers are illustrated in FIGS. 1-3, with the corresponding chamfers indicated at 16. In some examples, the annular planar surface is coplanar with one or more linear planar surfaces, such as in the example tube sheets of FIGS. 1 and 2, while in other examples, the annular planar surface is not coplanar with one or more linear planar surfaces, such as in the example tube sheet of FIG. 3.

Some such methods 30 that include milling (at 48) a chamfer, further comprise, prior to the milling (at 48) the chamfer, adjusting (at 50) the milling tool head assembly to adjust an angle of a secondary tool path of the milling tool head assembly relative to the workpiece. Typically, a milling tool head assembly has a cutting path (e.g., a primary cutting tool path) along (i.e., parallel to) a bridge of a milling machine, along which the milling tool head assembly is translated to mill a linear planar surface. However, in some methods 30, the milling tool head assembly is configured to provide a secondary tool path that is non-parallel to a corresponding bridge of the portable machine tool. Accordingly, this secondary cutting tool path may be used to machine chamfers between the annular planar surface and the linear planar surface and/or between two linear planar surfaces. The example milling tool head assembly 210 of portable machine tool 300 of FIGS. 7-11 and shown in detail in FIG. 11 provides such functionality and may be used to implement such methods 30.

In some methods 30, the facing (at 34) the annular planar surface is performed prior to the milling (at 38) the linear planar surface. Accordingly, some such examples further comprise, while the machine frame is fixedly coupled to the workpiece and after the facing (at 34), removing (at 52) the facing tool head assembly from the rotating ring; and while the machine frame is fixedly coupled to the workpiece, after the removing (at 52), and prior to the milling (38), mounting (54) the milling tool head assembly to the rotating ring.

In other examples of methods 30, the milling (at 38) the linear planar surface is performed prior to the facing (at 34) the annular planar surface. Accordingly, some such examples further comprise, while the machine frame is fixedly coupled to the workpiece and after the milling (at 38), removing (at 56) the milling tool head assembly from the rotating ring; and while the machine frame is fixedly coupled to the workpiece, after the removing (at 56), and prior to the facing (at 34), mounting (at 58) the facing tool head assembly to the rotating ring.

In some examples of methods 30, the portable machine tool is a flange facer, and with continued reference to FIG. 4, such methods may further comprise mounting (at 60) a milling machine to the rotating ring of the flange facer. Such example methods 30 may be performed utilizing a portable machining kit 100, discussed in greater detail below with respect to FIG. 5. In some examples in which the portable machine tool is a flange facer, the milling machine comprises the milling tool head assembly used to perform the milling (at 38) of the linear planar surface and optionally the milling (at 48) of a chamfer. In some such methods, the removing (at 52) the facing tool head assembly from the rotating ring comprises removing (at 62) the facing tool head assembly and a bridge of the flange facer from the rotating ring. In yet further examples that comprise mounting (at 60) a milling machine to the rotating ring of the flange facer, the flange facer is an outer-diameter (OD) mount flange facer and/or the milling machine is a gantry milling machine. In view of the above, some methods according to the present disclosure may be broadly described as using a machine frame of a flange facer and a rotating ring of the flange facer to mount a milling machine to a workpiece; and machining the workpiece using the milling machine when it is coupled to the rotating ring of the flange facer.

Also within the scope of the present disclosure are methods of retrofitting a flange facer to perform methods 30 in which the portable machine tool is a flange facer. For example, such methods of retrofitting may comprise creating a mounting structure on the rotating ring of the flange facer, with the mounting structure being configured to provide for operative mounting of a milling machine to the rotating ring of the flange facer. For example, the mounting structure may comprise holes in the rotating ring, with the holes in the rotating ring being configured to align with holes in the milling machine for receipt of fasteners to operatively mount the milling machine to the rotating ring. Additionally or alternatively, adapter brackets may be created and/or used to operatively mount the milling machine to a retrofitted flange facer.

In other examples and with continued reference to FIG. 4, rather than mounting a milling machine to the rotating ring of a flange facer, some methods 30 further comprise, prior to the facing (at 34), mounting (at 58) the facing tool head assembly to a bridge of the portable machine tool; and prior to the milling (at 38), mounting (at 54) the milling tool head assembly to the bridge. Such example methods 30 may be performed utilizing a portable machine tool 200, discussed in greater detail below with respect to FIG. 6. In other words, rather than having a kit that includes both a flange facer and a milling machine, a single portable machine tool may be used both with a facing tool head assembly and with a milling tool head assembly to perform such methods 30. Such portable machine tools additionally or alternatively may be described as combination flange facer and milling machines. In some such examples in which the facing tool head assembly and the milling tool head assembly each are mounted to the bridge at respective times, methods 30 further comprise, prior to the mounting (at 54), removing (at 52) the facing tool head assembly from the bridge, and/or prior to the mounting (at 58), removing (at 56) the milling tool head assembly from the bridge. In view of the above, some methods according to the present disclosure may be broadly described as machining each of an annular planar surface and a linear planar surface of a workpiece using a combination flange facer and milling machine. Moreover, in such examples, the mounting and dismounting of the facing tool head assembly and the milling tool head assembly may be performed manually by an operator without the need for any hoisting equipment. That is, the facing tool head assembly and the milling tool head assembly may be constructed so as to weigh less than a threshold weight, such as less than 50 pounds, less 40 pounds, or less than 30 pounds, with these examples being illustrative and non-exclusive.

Turning now to FIG. 5, portable machining kits 100 for machining an annular planar surface and a linear planar surface on a workpiece are schematically represented. As illustrated, such kits 100 comprise at least a flange facer 102 and a milling machine 110. The flange facer 102 comprises at least a machine frame 104, a rotating ring 106 that is rotatingly coupled to the machine frame 104, and a tool assembly 108 that is removably coupled to the rotating ring 106. In some examples, the tool assembly 108 of the flange facer comprises at least a bridge 126 and a facing tool head assembly 128 operably coupled to the bridge 126 for facing annular planar surfaces. The milling machine 110 is configured to be operatively mounted to the rotating ring 106 of the flange facer 102, for example, after first removing the tool assembly 108 (e.g., a bridge and a facing tool head assembly) from the rotating ring 106. Examples of suitable flange facers include (but are not limited to) the H & S TOOL SPEED FACER series by Climax and competitive products, and examples of suitable milling machines include (but are not limited to) the PM4200, LM5200, and LM6200 mills by Climax and competitive products.

Because the milling machine 110 is configured to be operatively mounted to the rotating ring 106 of the flange facer 102, the milling machine 110 when mounted to the rotating ring 106 may be selectively rotated relative to the flange facer's machine frame 104 to operably align a milling tool head assembly 118 of the milling machine for milling a linear planar surface on the workpiece, such as discussed in detail above with respect to methods 30.

Some kits 100 further comprise one or more adapter brackets 112 that are configured to operatively mount the milling machine 110 to the rotating ring 106 of the flange facer 102. In other words, in some examples, the milling machine 110 may not be configured to be directly mounted to, or engaged with, the rotating ring 106 of the flange facer, and instead one or more adapter brackets 112 may be provided as an interface between the milling machine 110 and the rotating ring 106. When provided, adapter brackets 112 provide structure for operably coupling the adapter brackets between the rotating ring 106 of the flange facer 102 and the milling machine 110. For example, adapter brackets 112 may have holes, slots, or other bores configured to be aligned with corresponding holes in the rotating ring 106 for receipt of fasteners therethrough, as well as holes, slots or other bores configured to be aligned with corresponding holes in the milling machine 110 for receipt of fasteners therethrough.

Some kits 100 further comprise at least one locking structure 114 that is configured to selectively lock the rotating ring 106 to the machine frame 104 to restrict rotation of the rotating ring 106 relative to the machine frame 104. Accordingly, the rotating ring 106 may be selectively (e.g., by a user) and temporarily restricted from rotating relative to the machine frame 104 for use of the milling machine 110 to mill a linear planar surface when the milling machine 110 is operatively coupled to the rotating ring 106. Any suitable locking structures 114 may be included in a kit 100 or be integral to a flange facer 102 thereof, illustrative, non-exclusive examples of which include an integral clamping mechanism of the flange facer, a locking pin or other structure and corresponding holes that, when aligned, extend at least partially through the rotating ring 106 and the machine frame 104, such that when the locking pin or other structure is operably positioned within the aligned holes, the rotating ring 106 is prevented from rotating relative to the machine frame 104. When provided, a locking structure 114 additionally may counteract milling loads to reduce loading on the bearings of the rotating ring 106. Additionally or alternatively, the static torque of a motor of the flange facer 102 may be used to restrict rotation of the rotating ring 106 relative to the machine frame 104 during a milling operation.

The rotating ring 106 of a flange facer 102 may be operatively and rotatingly coupled to the machine frame 104 using any suitable mechanism. For example, one or more of pulleys, belts, chains, gears, and assemblies thereof may be incorporated into a flange facer 102 to provide for rotational movement of the rotating ring 106 relative to the machine frame 104.

In some examples of kits 100, the bridge 116 is configured to be selectively translated relative to the rotating ring 106 of the flange facer 102 when the milling machine 110 is operatively coupled to the rotating ring 116. Accordingly, the bridge 116, and thus the milling tool head assembly 118, may be selectively positioned for operative milling of a linear planar surface on the workpiece. For example, some milling machines 110 further comprise a linear bed 130, along which the bridge 116 is configured to be selectively positioned, such as to align the milling tool head assembly 118 with respect to a workpiece for milling a linear planar surface thereof. When the milling machine 110 is a gantry milling machine, the linear bed 130 comprises two spaced-apart bed portions 132. In some such examples, it is the bed portions 132 that are configured to be operatively coupled to the rotating ring 106, either directly or via adapter brackets 112.

In example of kits 100, the milling machine 110 comprises a bridge 116 and a milling tool head assembly 118 that is coupled to the bridge 116. In some such examples, the milling tool head assembly 118 is configured to be selectively adjusted to adjust an angle of a secondary cutting tool path of the milling tool head assembly 118 relative to the bridge 116, such as discussed in connection with milling tool head assembly 210 of portable machine tools 200 discussed in greater detail below.

Some kits 100 further comprise a motor 120 that is configured to be selectively coupled to the flange facer 102 for operation thereof and to be selectively coupled to the milling machine 110 for operation thereof. In other words, some kits 100 comprise a common motor 120 that is configured to be coupled to each of the flange facer 102 and the milling machine 110. When coupled to the flange facer 102, the motor 120 operatively rotates the rotating ring 106, and thus the tool assembly 108, relative to the machine frame 104 for facing an annular planar surface. When coupled to the milling machine 110, the motor 120 operatively translates the milling tool head assembly 118 along the bridge 116 for milling a linear planar surface. In some examples, the same motor 120 also rotates the cutting tool of the milling tool head assembly 118, while in other examples, a separate motor is used to rotate the cutting tool of the milling tool head assembly 118.

Some kits 100 further comprise a manual adjuster 122 that is configured to selectively adjust an angular orientation of the rotating ring 106 relative to the machine frame 104. Accordingly, when the milling machine 110 is operatively coupled to the rotating ring 106, a user may manually adjust the angular orientation of the milling machine to properly align the milling tool head assembly 118 with the workpiece for milling a linear planar surface thereon. In some such examples, the machine frame 104 comprises a drive input 124 that is configured to be selectively coupled to and decoupled from the motor 120 for operation of the flange facer 102, and the manual adjuster 122 is configured to be selectively coupled to and decoupled from the drive input 124 when the motor is not coupled to the drive input 124. In other words, such as discussed above with respect to example methods 30, following a facing operation and prior to a milling operation, the motor 120 may be removed from the drive input 124, the manual adjuster 122 may be coupled to the drive input 124, and a user may manually rotate the rotating ring 106 to properly align the milling tool head assembly 118 with the workpiece for milling a linear planar surface thereon. As an illustrative, non-exclusive example, the manual adjuster 122 may comprise such structures as a gear box and a hand crank coupled to the gear box, and with the gear box being geared to provide a desired gear ratio from input by the hand crank to output by the rotating ring 106.

Turning now to FIG. 6, portable machine tools 200 for machining annular planar surfaces and linear planar surfaces on a workpiece are schematically represented. Portable machine tools 200 additionally or alternatively may be described as combination flange facer and milling machines. As schematically represented in FIG. 6, portable machine tools 200 typically comprise at least a machine frame 202 that is configured to be fixedly coupled to a workpiece to operatively support the portable machine tool 200 on the workpiece, a rotating ring 204 that is rotatingly coupled to the machine frame 202, a bridge 206 that is coupled to the rotating ring, a facing tool head assembly 208 that is configured to be selectively coupled to and decoupled from the bridge 206, and a milling tool head assembly 210 that also is configured to be selectively coupled to and decoupled from the bridge 206. The rotating ring 204 is configured to be selectively rotated relative to the machine frame 202 to rotate the facing tool head assembly 208 to operatively machine an annular planar surface on the workpiece when the facing tool head assembly 208 is coupled to the bridge 206. The rotating ring 204 may be rotatingly coupled to the machine frame 202 in any suitable and operative manner, including for example, via one or more of gears, belts, chains, pulleys, and assemblies thereof.

When the facing tool head assembly 208 is coupled to the bridge 206, the portable machine tool 200 functions as a flange facer, similar to a flange facer 102 of a kit 100, discussed above. The bridge 206 is configured to selectively translate the milling tool head assembly 210 along the bridge 206 to operatively machine a linear planar surface on the workpiece when the milling tool head assembly 210 is coupled to the bridge. In other words, when the milling tool head assembly 210 is coupled to the bridge 206, the portable machine tool 200 functions as a milling machine, similar to a milling machine 110 of a kit 100, discussed above. However, a typical flange facer, such as a flange facer 102 of a kit 100, is not configured to operatively translate a milling tool head assembly along a bridge thereof for milling a linear planar surface on a workpiece. Accordingly, a portable machine tool 200 additionally or alternatively may be described as a modified flange facer or as a flange facer with milling functionality.

In some examples, the rotating ring 204 has a feed tripper 228, the machine frame 202 has one or more tripper arms 230, and the bridge 206 has a feed box 224 operatively coupled to the feed tripper 228 (e.g., via a Bowden cable), with the feed tripper 228, the tripper arm 230, and the feed box 224 collectively defining a feed mechanism for incremental translation of a tool head assembly along the bridge 206. Accordingly, when a portable machine tool 200 is configured to face an annular planar surface (i.e., with the facing tool head assembly 208 installed on the bridge 206), as the rotating ring 204 rotates, engagement between the feed tripper 228 and a tripper arm 230 will cause the feed box 224 to operatively and incrementally translate the facing tool head assembly 208 along the bridge 206.

The bridge 206 of portable machine tools 200 therefore serve not only to operatively position the facing tool head assembly 208 relative to a workpiece for facing an annular planar surface thereof, but also to operatively position the milling tool head assembly 210 relative to a workpiece for milling a linear planar surface thereof. In some examples, the bridge 206 may be described as extending across, spanning, or dissecting the rotating ring 204. Because the bridge 206 carries and operatively translates the milling tool head assembly 210 when it is coupled to the bridge 206, the bridge additionally or alternatively may be described as a ram or a boom of portable machine tools 200.

In some examples, the rotating ring 204 comprises a linear bed 212, and the bridge 206 is configured to be selectively translated along a length of the linear bed 212. In other words, the relative position of the bridge 206 on the rotating ring 204 may be adjusted. In contrast, on typical flange facers, the bridge, or functionally equivalent structure thereof that carries a facing tool head assembly, is fixed relative to the rotating ring and is not configured to be adjusted.

In some such examples, the linear bed 212 comprises two spaced-apart bed portions 214, and the bridge 206 extends between the two spaced-apart bed portions 214 in a gantry configuration.

In some examples, the rotating ring 204 is configured to be selectively restricted from rotating relative to the machine frame 202 for operation of the milling tool head assembly 210 when the milling tool head assembly 210 is coupled to the bridge 206. In some such examples, the portable machine tool 200 further comprises one or more locking structures 222 that are configured to selectively lock the rotating ring 204 to the machine frame 202 to restrict rotation of the rotating ring 204 relative to the machine frame 202. Accordingly, the rotating ring 204 may be selectively (e.g., by a user) and temporarily restricted from rotating relative to the machine frame 202 when the milling tool head assembly 210 is coupled to the bridge 206 for milling a linear planar surface. Any suitable locking structures 222 may be included in a portable machine tool 200, and in some examples may be integral to one or both of the machine frame 202 or the rotating ring 204. Illustrative, non-exclusive examples of suitable locking structures 222 include an integral clamping mechanism of the machine frame 202, a locking pin or other structure and corresponding holes that, when aligned, extend at least partially through the rotating ring 204 and the machine frame 202, such that when the locking pin or other structure is operably positioned within the aligned holes, the rotating ring 204 is prevented from rotating relative to the machine frame 202. When provided, a locking structure 222 additionally may counteract milling loads to reduce loading on the bearings of the rotating ring 204. Additionally or alternatively, the static torque, or resistance, of a motor and/or associated gear box or gearing may be sufficient to restrict rotation of the rotating ring 204 relative to the machine frame 202.

In some examples of portable machine tools 200, the milling tool head assembly 210 is configured to be selectively adjusted to adjust an angle of a secondary cutting tool path of the milling tool head assembly 210 relative to the bridge 206 when the milling tool head assembly 210 is coupled to the bridge 206. Accordingly, in such examples, a milling operation may be performed along a path that is not parallel to the bridge 206. This secondary cutting tool path may be used to machine chamfers between two linear planar surfaces and/or between a linear planar surface and an annular planar surface, as discussed above in connection with example methods 30.

Some portable machine tools 200 further comprise a motor 216. The motor 216 is configured to be selectively coupled to and decoupled from the machine frame 202. In particular, the motor 216 is configured to selectively rotate the rotating ring 204 relative to the machine frame 202 when the motor 216 is coupled to the machine frame 202 for facing annular planar surfaces on a workpiece. The motor 216 also is configured to be selectively coupled to and decoupled from the bridge 206. In particular, the motor 216 is configured to selectively translate the milling tool head assembly 210 along the bridge 206 when the motor 216 is operatively coupled to the bridge 206 for milling linear planar surfaces on a workpiece. In other words, a single motor 216 may be provided as part of a portable machine tool 200. When coupled to the machine frame 202, the motor 216 operatively rotates the rotating ring 204, and thus the bridge 206 and the facing tool head assembly 208 when coupled thereto, relative to the machine frame 202 for facing an annular planar surface. When coupled to the bridge 206, the motor 216 operatively translates the milling tool head assembly 210 along the bridge 206 for milling a linear planar surface. In some examples, the same motor 216 also rotates the cutting tool of the milling tool head assembly 210, while in other examples, a separate motor is used to rotate the cutting tool of the milling tool head assembly 210.

Some examples of portable machine tools 200 further comprise a manual adjuster 218 that is configured to selectively adjust an angular orientation of the rotating ring 204 relative to the machine frame 202. Accordingly, a user may manually adjust the angular orientation of the rotating ring 204, and thus also the bridge 206, to properly align the milling tool head assembly 210 with the workpiece for milling a linear planar surface thereon, when the milling tool head assembly 210 is coupled to the bridge 206. In some such examples, the machine frame 202 comprises a drive input 220 that is configured to be operatively and selectively coupled to the motor 216 for selective rotation of the rotating ring 204 relative to the machine frame 202, and the manual adjuster 218 is configured to be operatively and selectively coupled to and decoupled from the drive input 220 for manual adjustment of the angular orientation of the rotating ring 204 relative to the machine frame 202. In other words, such as discussed above with respect to example methods 30, following a facing operation and prior to a milling operation, the motor 216 may be removed from the drive input 220, the manual adjuster 218 may be coupled to the drive input 220, and a user may manually rotate the rotating ring 204 to properly align the milling tool head assembly 210 with the workpiece for milling a linear planar surface thereon. As an illustrative, non-exclusive example, the manual adjuster 218 may comprise such structures as a gear box and a hand crank coupled to the gear box, and with the gear box being geared to provide a desired gear ratio from input by the hand crank to output by the rotating ring 204.

Additionally or alternatively, in some examples, the bridge 206 may comprise a feed box 224 that comprises a drive input 226 that is configured to be operatively and selectively coupled to the motor 216 for selective translation of a tool head assembly along the bridge 206, and the manual adjuster 218 is configured to be operatively and selectively coupled to and decoupled from the drive input 226 for manual adjustment of a translational position of a tool head assembly along the bridge 206. For example, when the facing tool head assembly 208 is operatively coupled to the bridge, the manual adjuster 218 may be used to manually align the facing tool head assembly with the workpiece for facing an annular planar surface thereon.

Additionally or alternatively, in some example, the feed box 224 comprises a manual adjustment feature that is configured to provide selective translation of a tool head assembly along the bridge 206.

Turning now to FIGS. 7-11, an illustrative, non-exclusive example of a portable machine tool 200, indicated and referred to herein as portable machine tool 300, is illustrated. Where appropriate, the reference numerals from the schematic illustration of FIG. 5 are used to designate corresponding parts of example portable machine tool 300 of FIGS. 7-11; however, the example of FIGS. 7-11 is non-exclusive and does not limit portable machine tools 200 to the illustrated example of portable machine tool 300. That is, portable machine tools 200 are not limited to the specific embodiments of portable machine tool 300, and portable machine tools 200 may incorporate any number of the various aspects, configurations, characteristics, properties, etc. of portable machine tools 200 that are illustrated in and discussed with reference to the schematic representation of FIG. 6 and/or the embodiment of FIGS. 7-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 7-11; however, it is within the scope of the present disclosure that the previously discussed features, variants, etc. may be utilized with the example of FIGS. 7-11.

Figure 7:
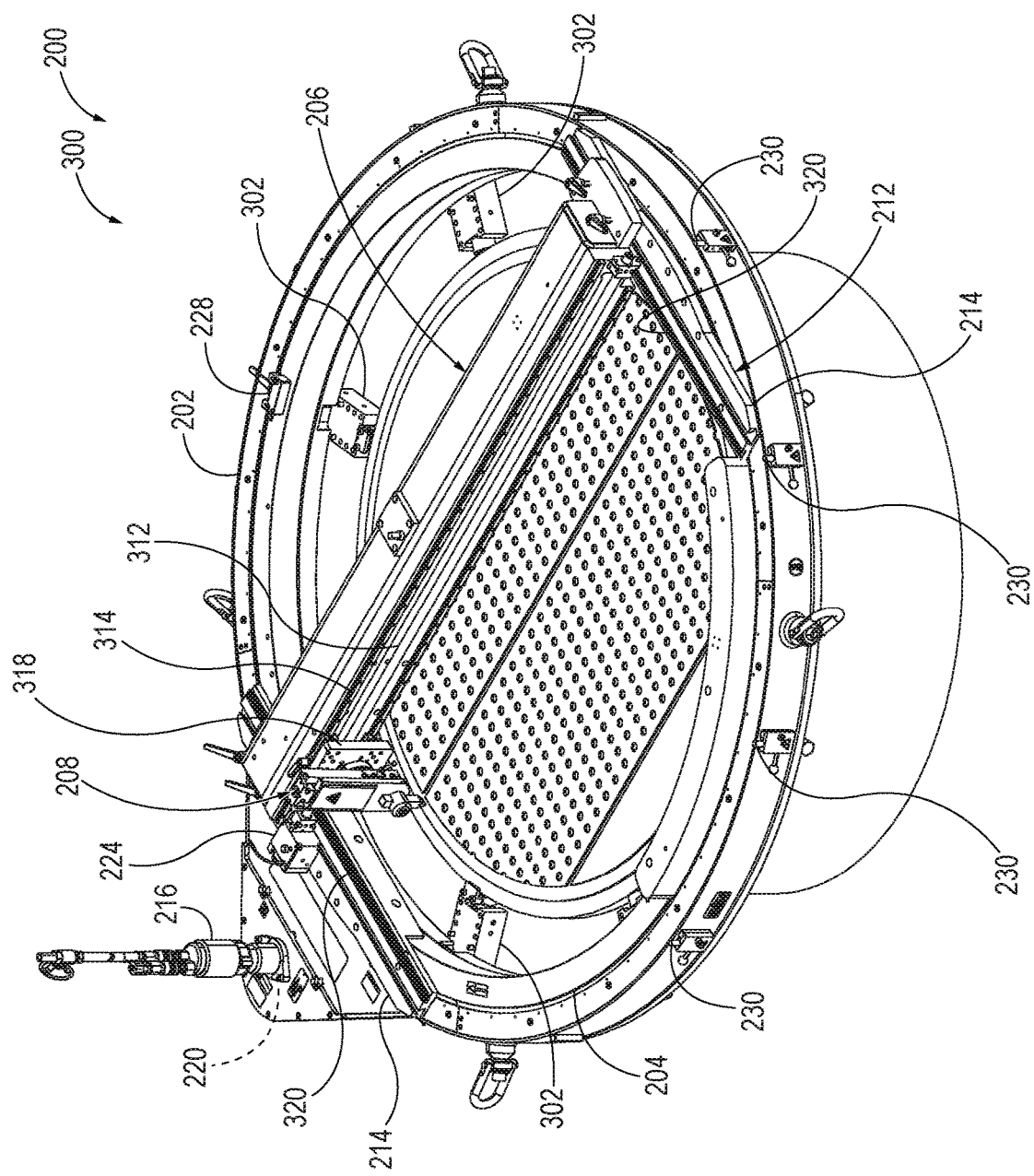
FIG. 7 is a perspective view of an example portable machine tool according to the present disclosure with a facing tool head assembly installed and shown with an example tube sheet to be machined.
Figure 8:
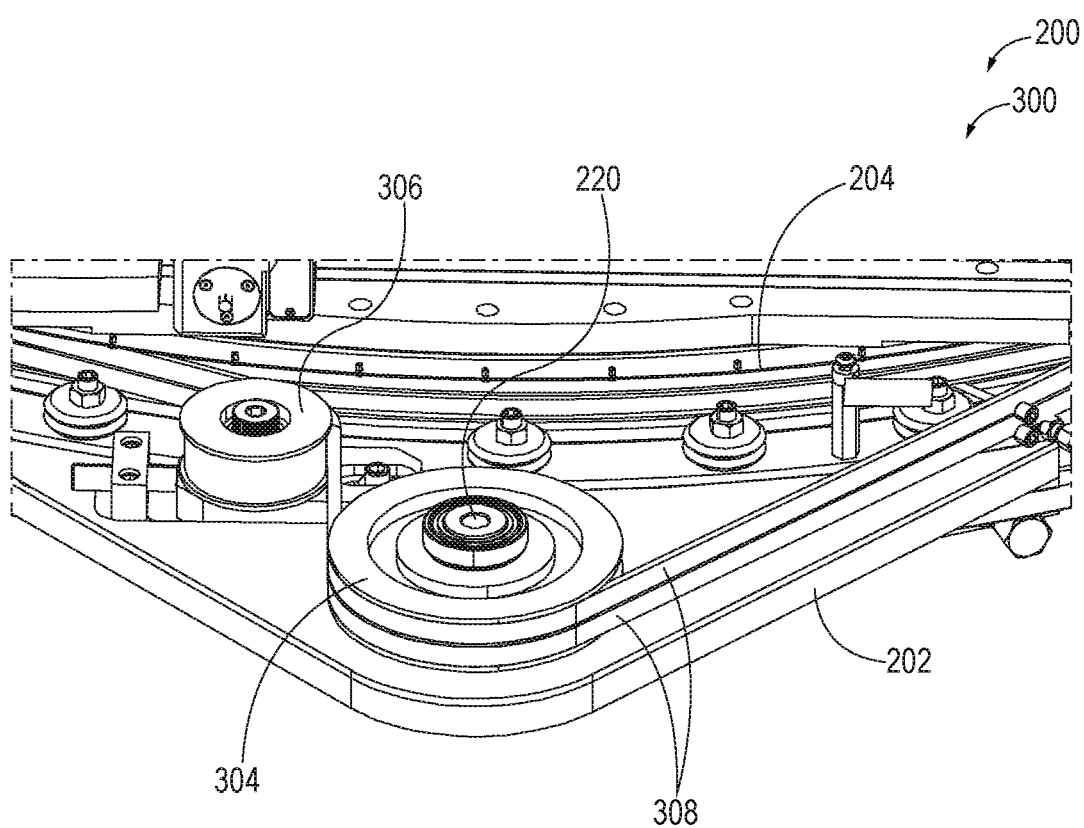
FIG. 8 is a detailed perspective cut-away view of a portion of the portable machine tool of FIG. 7.
Figure 9:
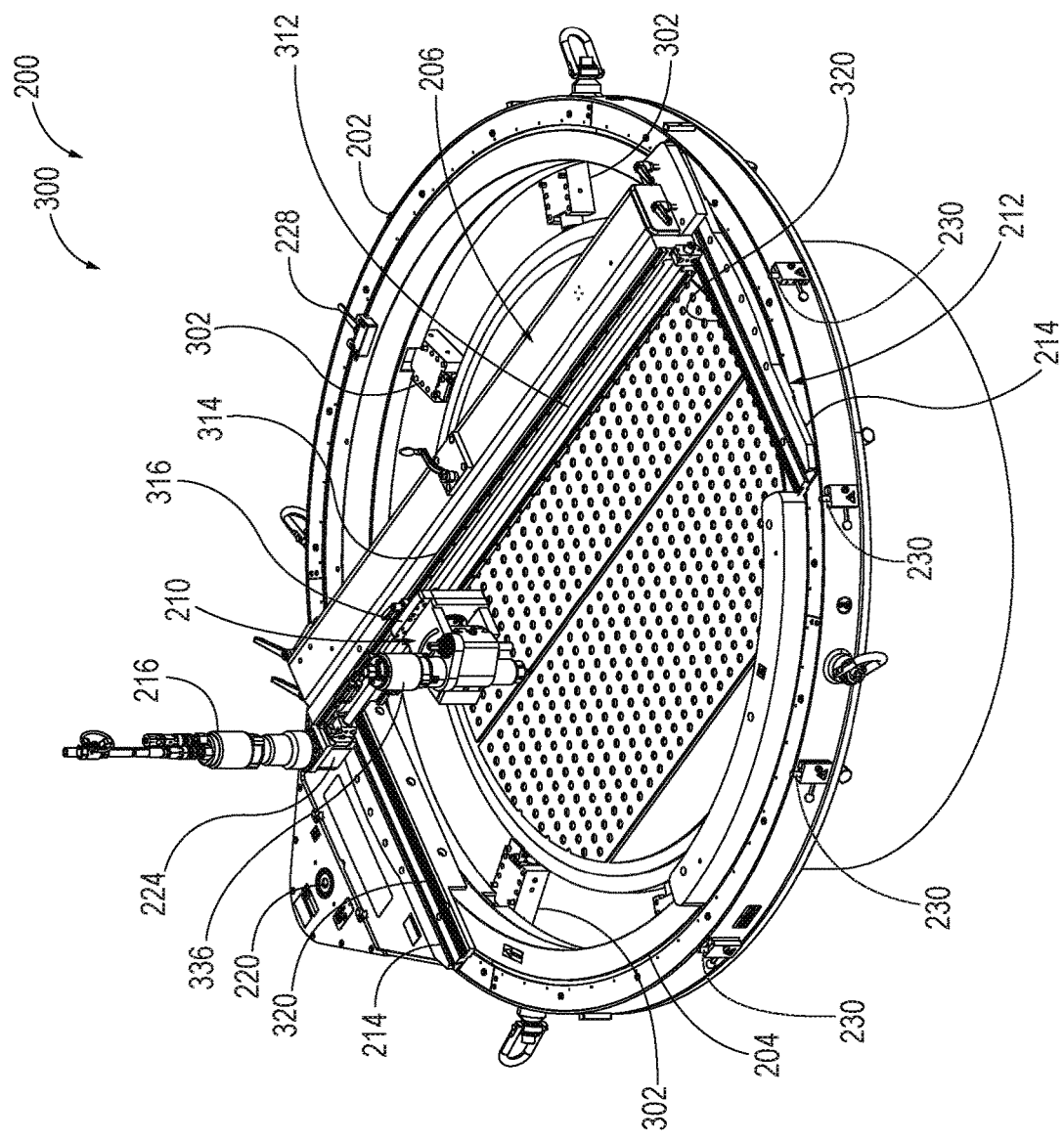
FIG. 9 is a perspective view of the portable machine tool of FIG. 7 with a milling tool head assembly installed and shown with the example tube sheet to be machined.
Figure 10:
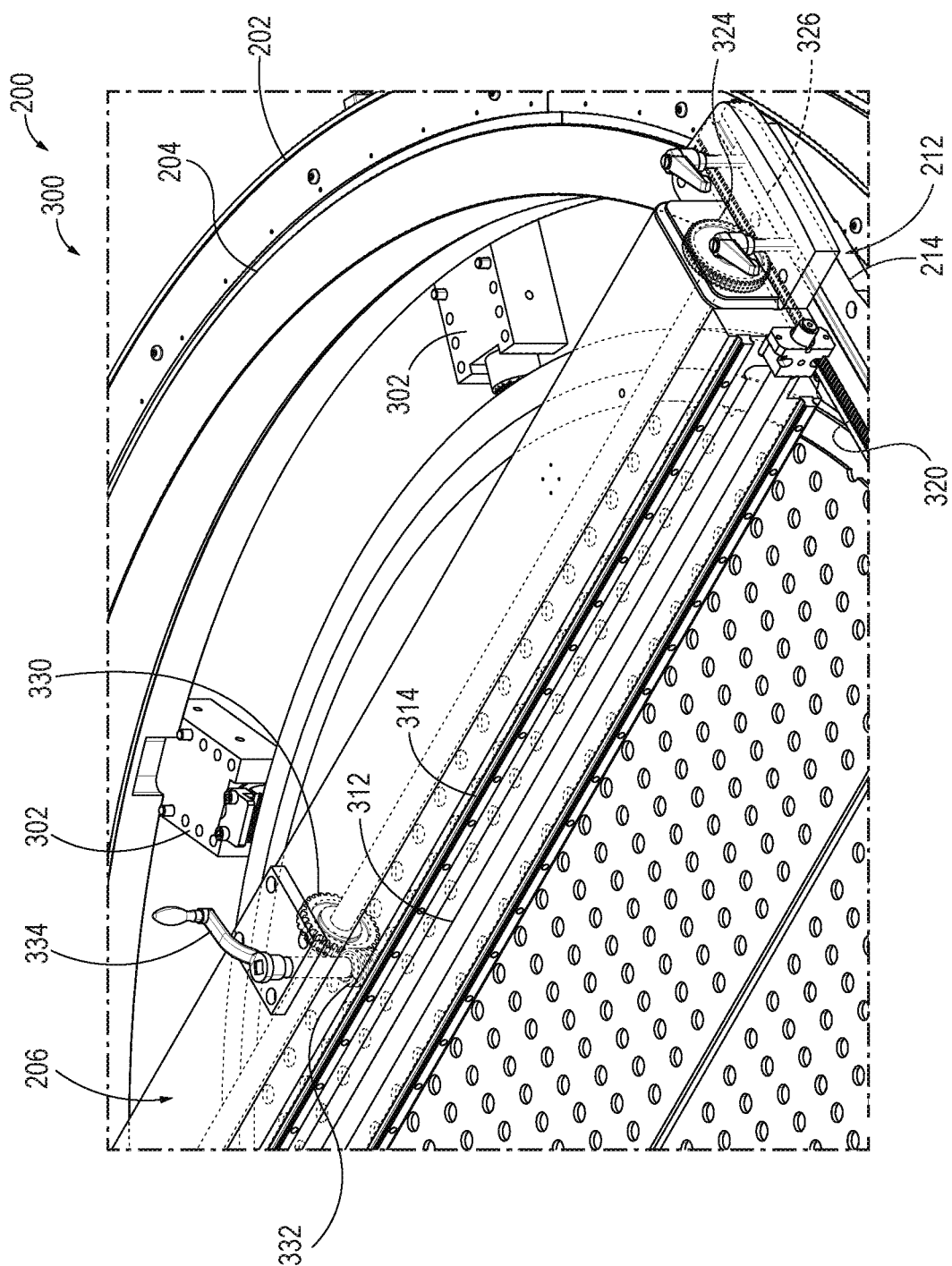
FIG. 10 is a detailed perspective view of a portion of the portable machine tool of FIG. 7.
Figure 11:
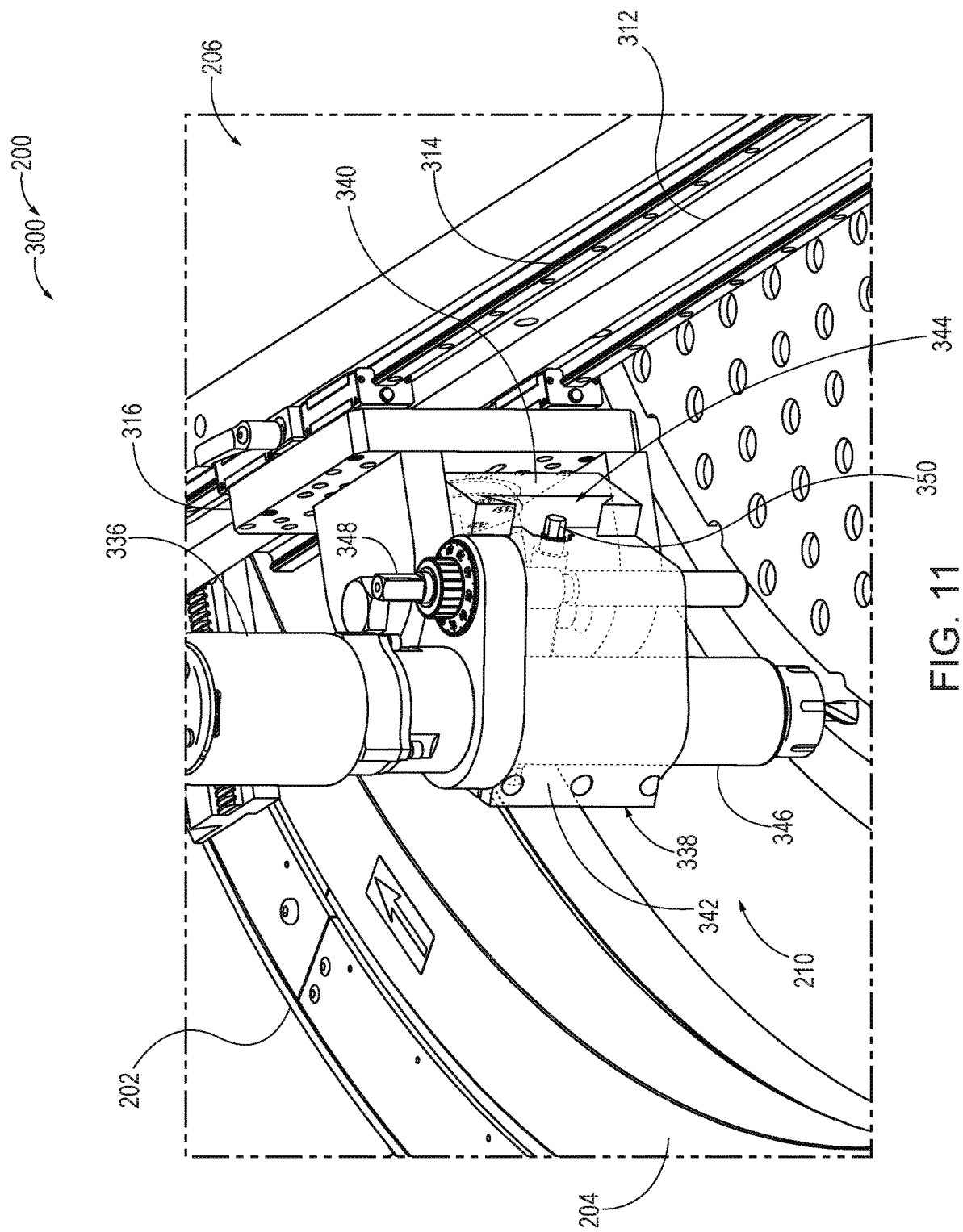
FIG. 11 is a detailed perspective view of a portion of the portable machine tool of FIG. 7 with the milling tool head assembly installed.

In each of FIGS. 7-11, portable machine tool 300 is illustrated with a non-exclusive example of a workpiece in the form of a tube sheet of a shell-and-tube heat exchanger. In particular, the illustrated example tube sheet includes an annular gasket surface and two parallel linear grooves. That said, as discussed herein, portable machine tools 200, including portable machine tool 300, are not limited to being used with such workpieces. In FIG. 7, portable machine tool 300 is illustrated with its facing tool head assembly 208 coupled to its bridge 206, and thus is configured for facing an annular planar surface, such as the annular gasket surface of the illustrated example tube sheet. In FIGS. 9-11, portable machine tool 300 is illustrated with its milling tool head assembly 210 coupled to its bridge 206, and thus is configured for milling a linear planar surface, such as the linear grooves of the illustrated example tube sheet.

The machine frame 202 of portable machine tool 300 includes a plurality of chuck foot assemblies 302 spaced around and extending radially inward from the machine frame 202 for operatively mounting the portable machine tool 300 to a workpiece.

As seen with reference to FIGS. 7 and 9, portable machine tool 300 is an example of a portable machine tool 200 that comprises a common motor 216 that is configured to be selectively coupled to the machine frame 202 (FIG. 7) and to be selectively coupled to the bridge 206 (FIG. 9). When coupled to the machine frame 202, and more specifically to a drive input 220 thereof, the motor 216 provides for operative rotation of the rotating ring 204, such as to face an annular planar surface of a workpiece. With reference to the detailed view of FIG. 8, the machine frame 202 comprises a drive pulley 304 coupled to the drive input 220, an idler pulley 306, and a pair of belts 308 that transfers the rotational input of the drive pulley 304 to the rotating ring 204. Portable machine tool 300 also is an example of a portable machine tool 200 that comprises a feed mechanism comprised of tripper arms 230 on the machine frame 202, a feed tripper 228 on the rotating ring 204, and a feed box 224 on the bridge 206 that is operatively coupled to the feed tripper 228 via a Bowden cable. Any suitable number of tripper arms may be utilized to control the feed rate. The bridge 206 comprises a feed screw 312 coupled to the feed box 224 and configured to rotate responsive to the feed tripper 228 being actuated. Feed screws additionally or alternatively may be described as lead screws and/or ball screws. The bridge 206 further comprises a track 314, to which a tool head assembly (e.g., the facing tool head assembly 208) is selectively coupled. The facing tool head assembly 208 comprises a carriage 318 that engages with the track 314 for translation therealong, and the facing tool head assembly 208 is configured to engage with the feed screw 312, such that when the feed screw 312 rotates, the facing tool head assembly 208 translates along the bridge 206.

When the motor 216 is coupled to the bridge 206, and more specifically to the feed box 224 thereof, the motor 216 provides for operative translation of the milling tool head assembly 210 along the bridge 206. More specifically, with reference to FIG. 9, the feed screw 312 is configured to rotate responsive to input from the motor 216 when operatively coupled to the feed box 224. The milling tool head assembly 210 comprises a carriage 316 that engages with the track 314 for translation therealong, and the milling tool head assembly 210 is configured to engage with the feed screw 312, such that when the feed screw 312 rotates in a first direction, the milling tool head assembly 210 translates in a first direction, and when the feed screw 312 rotates in a second opposite direction, the milling tool head assembly 210 translates in a second opposite direction.

As illustrated in FIG. 9, portable machine tool 300 comprises a second motor 336 operatively coupled to the milling tool head assembly 210 for operation of a milling cutting tool.

Portable machine tool 300 is an example of a portable machine tool 200 with a linear bed 212 comprised of two spaced-apart bed portions 214 as part of the rotating ring 204 for operative positioning of the bridge 206 along the linear bed 212. As perhaps best illustrated in FIG. 10, each bed portion 214 comprises a rack 320 and a T-slot 322, and the bridge 206 comprises corresponding pinion gears 324 and T-nuts 326 that engage with the rack 320 and the T-slot 322, respectively. The bridge 206 further comprises a rod 328 interconnecting the two pinion gears 324, a worm gear 330 carried by the rod 328, a worm 332 meshed with the worm gear 330, and a hand crank 334 coupled to the worm 332. Accordingly, rotation of the hand crank 334 causes the pinion gears 324 to rotate and ride along the racks 320 for translation of the bridge 206 along the linear bed 212. The T-nuts 326 are configured to be tightened against the bed portions 214 to lock the bridge 206 in a desired position along the linear bed 212.

Turning now to FIG. 11, the milling tool head assembly 210 of portable machine tool 300 is an example of a milling tool head assembly that is configured to be selectively adjusted to adjust an angle of a secondary cutting tool path of the milling tool head assembly 210 relative to the bridge 206 when the milling tool head assembly 210 is coupled to the bridge 206. More specifically, the milling tool head assembly 210 of portable machine tool 300 comprises a tool head 338 that is pivotally coupled to the carriage 316, and the tool head 338 comprises a tool head base 340 and a tool carrier 342 that is slidingly coupled to the tool head base 340 via a dove-tail joint 344 that is parallel to the secondary cutting tool path.

In particular, the tool head 338 comprises a feed screw 350 that is meshed with a block (not pictured) of the tool head base 340. Accordingly, when a user rotates the feed screw 350 (e.g., with a hand crank coupled thereto), the tool carrier 342 translates relative to the tool head base 340 along the dove-tail joint 344.

In addition, the tool head 338 is configured for selective vertical adjustment of a cutting tool relative to work piece. In particular, the milling tool head assembly 210 comprises a cutting tool spindle 346 that extends through the tool carrier 342, and the tool head 338 comprises an input shaft 348, rotation of which causes the cutting tool spindle 346 to translate vertically relative to the tool carrier 342. Moreover, the tool carrier 342 is configured to selectively clamp the cutting tool spindle 346 in a desired vertical position for operation of the milling tool head assembly 210.

The milling tool head assembly 210 of portable machine tool 300 therefore may be described as having five degrees of freedom or as providing five degrees of freedom for the associated cutting tool. More specifically, the milling tool head assembly is configured to be selectively translated along the track 314 of the bridge 206 (X-axis), the bridge 206 is configured to be selectively translated along the bed 212 (Y-axis), the cutting tool spindle 346 is configured to be selectively translated vertically relative to the tool carrier 342 (Z-axis), the tool head 338 is configured to be pivoted relative to the carriage 316 (about a C-axis), and the tool head 338 is configured to be selectively translated relative to the tool head base 340 (X2-axis). The X2-axis defines the "secondary cutting tool path," as used herein.

Illustrative, non-exclusive examples of inventive subject matter according to the present disclosure are described in the following enumerated paragraphs:

A. A method of machining an annular planar surface and a linear planar surface on a workpiece, the method comprising:

fixedly coupling a machine frame of a portable machine tool to the workpiece;

while the machine frame is fixedly coupled to the workpiece, facing the annular planar surface using a facing tool head assembly by rotating a rotating ring of the portable machine tool relative to the machine frame; and while the machine frame is fixedly coupled to the workpiece, milling the linear planar surface using a milling tool head assembly.

A1. The method of paragraph A, further comprising:

restricting rotation of the rotating ring relative to the machine frame;

wherein the milling if performed while the rotating ring is restricted from rotating relative to the machine frame.

A1.1. The method of paragraph A1, wherein the restricting comprises locking the rotating ring relative to the machine frame.

A2. The method of any of paragraphs A-A1.1, further comprising:
  while the machine frame is fixedly coupled to the workpiece, rotating the rotating ring relative to the machine frame to align the milling tool head assembly relative to the workpiece for milling the linear planar surface using the milling tool head assembly.

A2.1. The method of paragraph A2 when depending from paragraph A1, wherein the rotating is performed prior to the restricting.

A2.2. The method of any of paragraphs A2-A2.1, wherein the linear planar surface is a first linear planar surface, and wherein the method further comprises:
  while the machine frame is fixedly coupled to the workpiece and after the milling the first linear planar surface using the milling tool head assembly, rotating the rotating ring relative to the machine frame to align the milling tool head assembly relative to the workpiece for milling a second linear planar surface on the workpiece using the milling tool head assembly, and then milling the second linear planar surface using the milling tool head assembly.

A2.2.1. The method of paragraph A2.1, further comprising:
  while the machine frame is fixedly coupled to the workpiece, after the rotating the rotating ring relative to the machine frame to align the milling tool head assembly relative to the workpiece for milling the second linear planar surface on the workpiece using the milling tool head assembly, and prior to the milling the second linear planar surface using the milling tool head assembly, restricting rotation of the rotating ring relative to the machine frame.

A2.3. The method of any of paragraphs A2-A2.2.1, wherein the linear planar surface is a/the first linear planar surface, and wherein the method further comprises:
  while the machine frame is fixedly coupled to the workpiece and after the milling the first linear planar surface using the milling tool head assembly, translating the milling tool head assembly relative to the rotating ring to align the milling tool head assembly relative to the workpiece for milling a/the second linear planar surface on the workpiece using the milling tool head assembly, and then milling the second linear planar surface using the milling tool head assembly.

A2.3.1. The method of paragraph A2.3, wherein the translating the milling tool head assembly relative to the rotating ring comprises translating a bridge relative to the rotating ring.

A3. The method of any of paragraphs A-A2.3.1, further comprising:
  while the machine frame is fixedly coupled to the workpiece, milling a chamfer between the annular planar surface and the linear planar surface or between a/the first linear planar surface and a/the second linear planar surface.

A3.1. The method of paragraph A3, further comprising:
  prior to the milling the chamfer, adjusting the milling tool head assembly to adjust an angle of a secondary cutting tool path of the milling tool head assembly relative to the workpiece.

A4. The method of any of paragraphs A-A3.1, wherein the facing the annular planar surface using the facing tool head assembly is performed prior to the milling the linear planar surface using the milling tool head assembly.

A4.1. The method of paragraph A4, further comprising:
  while the machine frame is fixedly coupled to the workpiece and after the facing the annular planar surface using the facing tool head assembly, removing the facing tool head assembly from the rotating ring; and
  while the machine frame is fixedly coupled to the workpiece, after the removing the facing tool head assembly from the rotating ring, and prior to the milling the linear planar surface using the milling tool head assembly, mounting the milling tool head assembly to the rotating ring.

A5. The method of any of paragraphs A-A3.1, wherein the milling the linear planar surface using the milling tool head assembly is performed prior to the facing the annular planar surface using the facing tool head assembly.

A5.1. The method of paragraph A5, further comprising:
  while the machine frame is fixedly coupled to the workpiece and after the milling the linear planar surface using the milling tool head assembly, removing the milling tool head assembly from the rotating ring; and
  while the machine frame is fixedly coupled to the workpiece, after the removing the milling tool head assembly from the rotating ring, and prior to the facing the annular planar surface using the facing tool head assembly, mounting the facing tool head assembly to the rotating ring.

A6. The method of any of paragraphs A-A5.1, wherein the portable machine tool is a flange facer, and wherein the method further comprises:
  mounting a milling machine to the rotating ring, wherein the milling machine comprises the milling tool head assembly.

A6.1. The method of paragraph A6, when depending from paragraph A4.1 or A5.1, wherein the removing the facing tool head assembly from the rotating ring comprises removing the facing tool head assembly and a bridge of the flange facer from the rotating ring.

A6.2. The method of any of paragraphs A6-A6.1, wherein the milling machine is a gantry milling machine.

A6.3. The method of any of paragraphs A6-A6.2, wherein the flange facer is an outer-diameter (OD) mount flange facer.

A7. The method of any of paragraphs A-A5.1, further comprising:
  prior to the facing the annular planar surface using the facing tool head assembly, mounting the facing tool head assembly to a bridge of the portable machine tool; and
  prior to the milling the linear planar surface using the milling tool head assembly, mounting the milling tool head assembly to the bridge.

A7.1. The method of paragraph A7, further comprising:
  prior to the mounting the milling tool head assembly to the bridge, removing the facing tool head assembly from the bridge.

A7.2. The method of any of paragraphs A7-A7.1, further comprising:
  prior to the mounting the facing tool head assembly to the bridge, removing the milling tool head assembly from the bridge.

A8. The method of any of paragraphs A-A7.2, wherein the workpiece is a tube sheet of a shell-and-tube heat exchanger, wherein the annular planar surface is an annular circular gasket surface, and wherein the linear planar surface is a linear groove.

B. A method, comprising:
  using a machine frame of a flange facer and a rotating ring of the flange facer to mount a milling machine to a workpiece; and
  machining the workpiece using the milling machine when it is coupled to the rotating ring of the flange facer.

B1. The method of paragraph B, further comprising the subject matter of any of paragraphs A-A8.

C. A method comprising machining each of an annular planar surface and a linear planar surface of a workpiece using a combination flange facer and milling machine.

C1. The method of paragraph C, further comprising the subject matter of any of paragraphs A-A8.

D. A method of retrofitting a flange facer, the method comprising:

creating a mounting structure on a rotating ring of the flange facer, wherein the mounting structure is configured to provide for operative mounting of a milling machine to the rotating ring of the flange facer.

D1.1. The method of paragraph D, wherein the mounting structure comprises holes in the rotating ring, and wherein the holes in the rotating ring are configured to align with holes in the milling machine for receipt of fasteners to operatively mount the milling machine to the rotating ring.

E. A method, comprising:

performing the method of any of paragraphs D-D1.1; and performing the method of any of paragraphs A6-A6.3, wherein the flange facer and the milling machine of paragraph D are the flange facer and the milling machine of paragraph A6.

F. A portable machining kit (100) for machining an annular planar surface and a linear planar surface on a workpiece, the portable machining kit (100) comprising:

a flange facer (102), comprising a machine frame (104), a rotating ring (106) that is rotatingly coupled to the machine frame (104), and a tool assembly (108) that is removably coupled to the rotating ring (106); and a milling machine (110) configured to be operatively mounted to the rotating ring (106) of the flange facer (102).

F1. The portable machining kit (100) of paragraph F, further comprising:

one or more adapter brackets (112) configured to operatively mount the milling machine (110) to the rotating ring (106) of the flange facer (102).

F2. The portable machining kit (100) of any of paragraphs F-F1, further comprising:

at least one locking structure (114) configured to selectively lock the rotating ring (106) to the machine frame (104) to restrict rotation of the rotating ring (106) relative to the machine frame (104).

F3. The portable machining kit (100) of any of paragraphs F-F2, wherein the milling machine (110) is a gantry milling machine.

F4. The portable machining kit (100) of any of paragraphs F-F3, wherein the flange facer (102) is an outer-diameter (OD) mount flange facer.

F5. The portable machining kit (100) of any of paragraphs F-F4, wherein the milling machine (110) comprises a bridge (116) and a milling tool head assembly (118) coupled to the bridge (116).

F5.1. The portable machining kit (100) of paragraph F5, wherein the bridge (116) is configured to be selectively translated relative to the rotating ring (106) of the flange facer (102) when the milling machine (110) is operatively coupled to the rotating ring (116).

F5.1.1. The portable machining kit (100) of paragraph F5.1, wherein the milling machine (110) further comprises a linear bed (130), and wherein the bridge (116) is configured to be selectively positioned along the linear bed (130).

F5.2. The portable machining kit (100) of any of paragraphs F5-F5.1.1, wherein the milling tool head assembly (118) is configured to be selectively adjusted to adjust an angle of a secondary cutting tool path of the milling tool head assembly (118) relative to the bridge (116).

F5.3. The portable machining kit (100) of any of paragraphs F5-F5.1.1, wherein the milling tool head assembly (118) comprises a tool head (338), wherein the tool head (338) comprises:

a tool head base (340) that is pivotally coupled to a carriage (316) that is configured to translate along a track (314) of the bridge (116); and a tool carrier (342) that is slidingly coupled to the tool head base (340) to define the secondary cutting tool path of the milling tool head assembly (118).

F5.3.1. The portable machining kit (100) of paragraph F5.3, wherein the milling tool head assembly (118) further comprises a cutting tool spindle (346) that extends through the tool carrier (342), and wherein the cutting tool spindle (346) is configured to be selectively and vertically adjusted relative to the tool carrier (342).

F6. The portable machining kit (100) of any of paragraphs F-F5.3.1, further comprising a motor (120) configured to be selectively coupled to the flange facer (102) for operation thereof and to be selectively coupled to the milling machine (110) for operation thereof.

F7. The portable machining kit (100) of any of paragraphs F-F6, further comprising a manual adjuster (122) configured to selectively adjust an angular orientation of the rotating ring (106) relative to the machine frame (104).

F7.1. The portable machining kit (100) of paragraph F7, wherein the machine frame (104) comprises a drive input (124) configured to be selectively coupled to and decoupled from a/the motor (120) for operation of the flange facer (102), and wherein the manual adjuster (122) is configured to be selectively coupled to and decoupled from the drive input (124) for manual adjustment of the angular orientation of the rotating ring (106) relative to the machine frame (104).

F8. The portable machining kit (100) of any of paragraphs F-F7.1, configured to perform the method of any of paragraphs A-C1.

G. A portable machine tool (200), comprising:

a machine frame (202) configured to be fixedly coupled to a workpiece to operatively support the portable machine tool (200) on the workpiece;

a rotating ring (204) that is rotatingly coupled to the machine frame (202);

a bridge (206) coupled to the rotating ring;

a facing tool head assembly (208) configured to be selectively coupled to and decoupled from the bridge (206), wherein the rotating ring (204) is configured to be selectively rotated relative to the machine frame (202) to rotate the facing tool head assembly (208) to operatively machine an annular planar surface on the workpiece when the facing tool head assembly (208) is coupled to the bridge (206); and a milling tool head assembly (210) configured to be selectively coupled to and decoupled from the bridge (206), wherein the bridge (206) is configured to selectively translate the milling tool head assembly (210) along the bridge (206) to operatively machine a linear planar surface on the workpiece when the milling tool head assembly (210) is coupled to the bridge.

G1. The portable machine tool (200) of paragraph G, wherein the rotating ring (204) comprises a linear bed (212), and wherein the bridge (206) is configured to be selectively translated along a length of the linear bed (212).

G1.1. The portable machine tool (200) of paragraph G1, wherein the linear bed (212) comprises two spaced-apart bed portions (214), and wherein the bridge (206) extends between the two spaced-apart bed portions (214) in a gantry configuration.

G2. The portable machine tool (200) of any of paragraphs G-G1.1, wherein the rotating ring (204) is configured to be selectively restricted from rotating relative to the machine frame (202) for operation of the milling tool head assembly (210) when the milling tool head assembly (210) is coupled to the bridge (206).

G2.1. The portable machine tool (200) of paragraph G2, further comprising:

at least one locking structure (222) configured to selectively lock the rotating ring (204) to the machine frame (202) to restrict rotation of the rotating ring (204) relative to the machine frame (202).

G3. The portable machine tool (200) of any of paragraphs G-G2.1, wherein the milling tool head assembly (210) is configured to be selectively adjusted to adjust an angle of a secondary cutting tool path of the milling tool head assembly (210) relative to the bridge (206) when the milling tool head assembly (210) is coupled to the bridge (206).

G3.1. The portable machine tool (200) of paragraph G3, wherein the milling tool head assembly (210) comprises a tool head (338), wherein the tool head (338) comprises:

a tool head base (340) that is pivotally coupled to a carriage (316) that is configured to translate along a track (314) of the bridge (206); and a tool carrier (342) that is slidingly coupled to the tool head base (340) to define the secondary cutting tool path of the milling tool head assembly (210).

G3.1.1. The portable machine tool (200) of paragraph G3.1, wherein the milling tool head assembly (210) further comprises a cutting tool spindle (346) that extends through the tool carrier (342), and wherein the cutting tool spindle (346) is configured to be selectively and vertically adjusted relative to the tool carrier (342).

G4. The portable machine tool of any of paragraphs G-G3.1.1, further comprising a motor (216);

wherein the motor (216) is configured to be selectively coupled to and decoupled from the machine frame (202), wherein the motor (216) is configured to selectively rotate the rotating ring (204) relative to the machine frame (202) when the motor (216) is coupled to the machine frame (212); and wherein the motor (216) is configured to be selectively coupled to and decoupled from the bridge (206), wherein the motor (216) is configured to selectively translate the milling tool head assembly (210) along the bridge (206) when the motor (216) is operatively coupled to the bridge (206).

G5. The portable machine tool (200) of any of paragraphs G-G4, further comprising a manual adjuster (218) configured to selectively adjust an angular orientation of the rotating ring (204) relative to the machine frame (202).

G5.1. The portable machine tool (200) of paragraph G5 wherein the machine frame (202) comprises a drive input (220) configured to be operatively and selectively coupled to a/the motor (216) for selective rotation of the rotating ring (204) relative to the machine frame (202), and wherein the manual adjuster (218) is configured to be operatively and selectively coupled to and decoupled from the drive input (220) for manual adjustment of the angular orientation of the rotating ring (204) relative to the machine frame (202).

G6. The portable machine tool of any of paragraphs G-G5.1, configured to perform the method of any of paragraphs A-C1.

H. A milling tool head assembly (210) for a machine tool, the milling tool head assembly (210) comprising:

a tool head (338), wherein the tool head (338) comprises:

a tool head base (340) that is configured to be pivotally coupled to a carriage (316) for translation along a track (314) of a bridge (206) of the machine tool, wherein the track (314) defines a primary cutting tool path of the milling tool head assembly (210); and a tool carrier (342) that is slidingly coupled to the tool head base (340) to define a secondary cutting tool path of the milling tool head assembly (210).

H1. The milling tool head assembly (210) of paragraph H, wherein the milling tool head assembly (210) further comprises a cutting tool spindle (346) that extends through the tool carrier (342), and wherein the cutting tool spindle (346) is configured to be selectively and vertically adjusted relative to the tool carrier (342).

H2. The milling tool head assembly (210) of any of paragraphs H-H1, further comprising the carriage (316), wherein the tool head base (340) is pivotally coupled to the carriage (316).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A portable machine tool, comprising:

a machine frame configured to be fixedly coupled to a workpiece to operatively support the portable machine tool on the workpiece;

a rotating ring that is rotatingly coupled to the machine frame, wherein the rotating ring comprises a linear bed;

a bridge coupled to the rotating ring, wherein the bridge is configured to be selectively translated along a length of the linear bed;

a facing tool head assembly configured to be selectively coupled to and decoupled from the bridge, wherein the rotating ring is configured to be selectively rotated relative to the machine frame to rotate the facing tool head assembly to operatively machine an annular planar surface on the workpiece when the facing tool head assembly is coupled to the bridge; and a milling tool head assembly configured to be selectively coupled to and decoupled from the bridge, wherein the bridge is configured to selectively translate the milling tool head assembly along the bridge to operatively machine a linear planar surface on the workpiece when the milling tool head assembly is coupled to the bridge.

2. The portable machine tool of claim 1, wherein the linear bed comprises two spaced-apart bed portions, and wherein the bridge extends between the two spaced-apart bed portions in a gantry configuration.

3. The portable machine tool of claim 1, wherein the rotating ring is configured to be selectively restricted from rotating relative to the machine frame for operation of the milling tool head assembly when the milling tool head assembly is coupled to the bridge.

4. The portable machine tool of claim 1, wherein the milling tool head assembly is configured to be selectively adjusted to adjust an angle of a secondary cutting tool path of the milling tool head assembly relative to the bridge when the milling tool head assembly is coupled to the bridge.

5. The portable machine tool of claim 4, wherein the milling tool head assembly comprises a tool head, wherein the tool head comprises:
   a tool head base that is pivotally coupled to a carriage that is configured to translate along a track of the bridge; and
   a tool carrier that is slidingly coupled to the tool head base to define the secondary cutting tool path of the milling tool head assembly.

6. The portable machine tool of claim 5, wherein the milling tool head assembly further comprises a cutting tool spindle that extends through the tool carrier, and wherein the cutting tool spindle is configured to be selectively and vertically adjusted relative to the tool carrier.

7. The portable machine tool of claim 1, further comprising a motor;
   wherein the motor is configured to be selectively coupled to and decoupled from the machine frame, wherein the motor is configured to selectively rotate the rotating ring relative to the machine frame when the motor is coupled to the machine frame; and
   wherein the motor is configured to be selectively coupled to and decoupled from the bridge, wherein the motor is configured to selectively translate the milling tool head assembly along the bridge when the motor is operatively coupled to the bridge.

8. The portable machine tool of claim 1, further comprising a manual adjuster configured to selectively adjust an angular orientation of the rotating ring relative to the machine frame.

9. The portable machine tool of claim 8, wherein the machine frame comprises a drive input configured to be operatively and selectively coupled to a motor for selective rotation of the rotating ring relative to the machine frame, and wherein the manual adjuster is configured to be operatively and selectively coupled to and decoupled from the drive input for manual adjustment of the angular orientation of the rotating ring relative to the machine frame.

10. A method of machining an annular planar surface and a linear planar surface on a workpiece, the method comprising:
   fixedly coupling a machine frame of a portable machine tool to the workpiece;
   while the machine frame is fixedly coupled to the workpiece, facing the annular planar surface using a facing tool head assembly coupled to a bridge by rotating a rotating ring of the portable machine tool relative to the machine frame;
   while the machine frame is fixedly coupled to the workpiece, translating the bridge along a length of a linear bed of the rotating ring; and
   while the machine frame is fixedly coupled to the workpiece, milling the linear planar surface using a milling tool head assembly coupled to the bridge.

11. The method of claim 10, further comprising:
   while the machine frame is fixedly coupled to the workpiece, rotating the rotating ring relative to the machine frame to align the milling tool head assembly relative to the workpiece for milling the linear planar surface using the milling tool head assembly.

12. The method of claim 10, wherein the linear planar surface is a first linear planar surface, and wherein the method further comprises:
   while the machine frame is fixedly coupled to the workpiece and after the milling the first linear planar surface using the milling tool head assembly, rotating the rotating ring relative to the machine frame to align the milling tool head assembly relative to the workpiece for milling a second linear planar surface on the workpiece using the milling tool head assembly, and then milling the second linear planar surface using the milling tool head assembly.

13. The method of claim 10, wherein the linear planar surface is a first linear planar surface, and wherein the method further comprises:
   while the machine frame is fixedly coupled to the workpiece and after the milling the first linear planar surface using the milling tool head assembly, translating the milling tool head assembly relative to the rotating ring to align the milling tool head assembly relative to the workpiece for milling a second linear planar surface on the workpiece using the milling tool head assembly, and then milling the second linear planar surface using the milling tool head assembly.

14. The method of claim 10, further comprising:
   while the machine frame is fixedly coupled to the workpiece, milling a chamfer between the annular planar surface and the linear planar surface or between a first linear planar surface and a second linear planar surface.

15. The method of claim 14, further comprising:
   prior to the milling the chamfer, adjusting the milling tool head assembly to adjust an angle of a secondary cutting tool path of the milling tool head assembly relative to the workpiece.

16. The method of claim 10, wherein the facing the annular planar surface using the facing tool head assembly is performed prior to the milling the linear planar surface using the milling tool head assembly.

17. The method of claim 16, further comprising:
   while the machine frame is fixedly coupled to the workpiece and after the facing the annular planar surface using the facing tool head assembly, removing the facing tool head assembly from the rotating ring; and
   while the machine frame is fixedly coupled to the workpiece, after the removing the facing tool head assembly from the bridge, and prior to the milling the linear planar surface using the milling tool head assembly, mounting the milling tool head assembly to the bridge.

18. The method of claim 10, wherein the milling the linear planar surface using the milling tool head assembly is performed prior to the facing the annular planar surface using the facing tool head assembly.

19. The method of claim 18, further comprising:
   while the machine frame is fixedly coupled to the workpiece and after the milling the linear planar surface using the milling tool head assembly, removing the milling tool head assembly from the bridge; and while the machine frame is fixedly coupled to the workpiece, after the removing the milling tool head assembly from the rotating ring, and prior to the facing the annular planar surface using the facing tool head assembly, mounting the facing tool head assembly to the bridge.

20. The method of claim 10, further comprising:

prior to the facing the annular planar surface using the facing tool head assembly, mounting the facing tool head assembly to the bridge; and prior to the milling the linear planar surface using the milling tool head assembly, mounting the milling tool head assembly to the bridge.

21. The method of claim 10, wherein the workpiece is a tube sheet of a shell-and-tube heat exchanger, wherein the annular planar surface is an annular circular gasket surface, and wherein the linear planar surface is a linear groove.

* * * * *